United States Patent

Hampshire

[11] Patent Number: 5,329,409
[45] Date of Patent: Jul. 12, 1994

[54] CORRECTION OF CURRENT FEEDBACK OFFSET FOR DISC DRIVE SERVO SYSTEMS

[75] Inventor: Randall D. Hampshire, Edmond, Okla.

[73] Assignee: Seagate Technology, Inc., Scotts Valley, Calif.

[21] Appl. No.: 734,938

[22] Filed: Jul. 24, 1991

[51] Int. Cl.⁵ .................. G11B 5/596; G11B 15/46
[52] U.S. Cl. .......................... 360/77.02; 360/73.09; 360/78.04; 318/368
[58] Field of Search .... 360/77.02, 77.04, 78.06–78.08, 360/78.04, 78.11–78.12, 73.08–73.09, 73.11, 74.1; 369/32, 44.28; 318/368, 364, 356

[56] References Cited

U.S. PATENT DOCUMENTS

| | | | |
|---|---|---|---|
| 3,893,180 | 7/1975 | Braun et al. | 360/77 |
| 4,092,682 | 5/1978 | Andrews, Jr. et al. | 360/77 |
| 4,168,457 | 9/1979 | Rose | 318/561 |
| 4,314,191 | 2/1982 | Oda et al. | 360/78 |
| 4,329,721 | 5/1982 | Lee et al. | 360/78 |
| 4,331,987 | 5/1982 | Oda et al. | 360/78 |
| 4,333,117 | 1/1982 | Johnson | 360/78.7 |
| 4,480,217 | 10/1984 | Robbins et al. | 318/618 |
| 4,551,776 | 11/1985 | Roalson | 360/77 |
| 4,669,004 | 5/1987 | Moon et al. | 360/77 |
| 4,835,633 | 5/1989 | Edel et al. | 360/78.12 |
| 4,899,325 | 2/1990 | Katsuhara et al. | 369/32 |
| 4,908,561 | 3/1990 | Hashimoto | 360/78.07 |
| 5,003,415 | 3/1991 | Freeze | 360/78.6 |
| 5,010,425 | 4/1991 | Asai | 360/78.04 |
| 5,063,454 | 11/1991 | Hashimoto | 360/78.04 |

FOREIGN PATENT DOCUMENTS 0000261 10/1979 European Pat. Off. ......... 360/78.04

Primary Examiner—Aristotelis Psitos
Assistant Examiner—Varsha V. Sheladia
Attorney, Agent, or Firm—Kinney & Lange

[57] ABSTRACT

A process is provided for compensating for offset in the actuator current of the servo system of a disc drive. A typical disc drive includes a power amplifier providing actuator current to the actuator coil of the drive. A sensing resistor is responsive to the actuator current to provide a feedback signal representative of the magnitude of the actuator current, the feedback signal being provided to the power mechanism to derive the actual actuator current. By the present technique, offset in the actuator current is compensated by operating the transducer to move at predetermined constant velocities (for example, the maximum velocities) in first and second opposite directions across the surface of the disc and by measuring the resulting actual velocities. The feedback signal is adjusted based upon any difference between the actual velocities measured in the first and second directions.

23 Claims, 2 Drawing Sheets

CORRECTION OF CURRENT FEEDBACK OFFSET FOR DISC DRIVE SERVO SYSTEMS

This invention relates to a method of correcting current feedback offset in a disc drive servo system, and particularly to a method for compensating the actuator signal during seek movements of a head to a selected track on a rotating disc of a disc drive.

Disc drives are commonly used with computers to store data on concentric tracks defined in magnetic coatings formed on the magnetic discs. In the case of hard discs, the rigidity of the discs permit data tracks to be closely spaced to permit storage of large quantities of information. Data is written to or read from selected tracks on a disc by a read/write transducing head, supported by a pivotal actuator to move the transducing head across the disc in response to a current through a coil on the actuator.

During a "seek" mode, it is desirable to move the transducing head from one track to another in as short of time as possible. Movement is accomplished by passing current through the actuator coil, thereby causing acceleration (or deceleration) of the transducing head in a direction dependent on the direction of the current. Theoretically, zero current to the actuator coil will neither accelerate nor decelerate the transducing head, so that the head will travel at a constant velocity (which could be zero if the transducing head is at rest). However, effects of temperature, humidity, air density, air movement, actuator torque capacity, external shock and vibration, etc., tend to deteriorate the operating conditions of the transducing head movement from the theoretical to an actual condition wherein a small amount of current may be required to maintain a continuous seek velocity.

It is common to provide a velocity demand profile to control movement of the transducing head. A plurality of velocity demand profiles are stored in the memory of a microprocessor associated with the disc drive to control track seek operations under various conditions. The velocity demand profile establishes the design velocity of the transducing head across the tracks during a seek mode, thereby controlling the current and hence the acceleration and deceleration patterns for the head movement to achieve the design velocity. Hence, during a seek operation, the microprocessor will drive the actuator coil with a current dictated by the velocity demand profile stored in the memory of a microprocessor, typically accelerating the transducing head to a maximum seek velocity, and decelerating the head to hopefully bring the transducing head to a halt over the desired destination track. An example of such an arrangement is shown in U.S. Pat. No. 4,899,234 to Genheimer, and assigned to the same assignee as the present invention. The teachings of the Genheimer patent are herein incorporated by reference.

In practice, however, the actual velocity profile of the transducing head will not coincide with the velocity demand profile stored in the microprocessor memory. Particularly, bias forces are exerted on the transducing heads by temperature, humidity, etc., as well as by air currents due to rotation of the disc and mechanical forces imposed by electrical leads connected to the head. The result is that the demand and actual velocity profiles will be different.

Moreover, electronic offsets affect the head acceleration and deceleration, thereby contributing to the difference between the actual and demand velocity profiles. As described above, it is usually necessary to provide a small current to the actuator coil to maintain a constant seek velocity. The small current needed is determined by the microprocessor and added to the current established by the velocity demand profile. Particularly, a digital-to-analog (D/A) converter is provided at the output of the microprocessor to drive the power amplifier for the actuator coil. Typically, the D/A converter is responsive to a count from the microprocessor to generate a drive current for the power amplifier. For example, a count of 256 (100000000) in a nine-bit D/A converter might generate a zero current (and hence, a constant theoretical velocity), whereas higher counts will generate currents in one direction and lower counts will generate currents in the opposite direction. Thus, a count of 56 (000111000) might represent a maximum current (acceleration) in one direction, and a count of 456 (111001000) might represent maximum current (acceleration) in the opposite direction. However, if actual conditions dictate a small current to maintain actual velocity, the microprocessor might actually drive the D/A converter so that a small count is added to or subtracted from that normally supplied by the microprocessor. For example, the microprocessor might adjust the null count to 257 or 255 to cause a small signal to be generated by D/A converter for correction purposes.

In U.S. Pat. No. 5,184,571 dated Feb. 23, 1993, by Murphy et. al. for "Adaptive Settle Time Minimization for a Hard Disc Drive", assigned to the same assignee as the present invention, there is described apparatus for compensating for offset and for operating the power amplifier for the coil of an actuator. In particular, a number, representative of a selected profile velocity, is stored in a latch and is used to generate the actuator current for the actuator coil. Offset is corrected by driving the transducing head at a maximum velocity in a first direction for a predetermined period of time, and counting the actual number of tracks crossed. The process is repeated to determine the number of tracks crossed in the same predetermined period of time at maximum velocity in the opposite direction. Any difference between the two track counts represents the amount and direction of offset. The number in the latch is incremented or decremented, thereby adjusting the velocity profiles for each direction and hence compensating the actuator current to adjust for offset. The process is iteratively repeated until the effects of offset are minimized.

One of the problems with the aforementioned Murphy et al. application is that the offset compensation requires apparatus specifically included for this purpose. Further, the offset is measured by the secondary effect of performance of the head movement, rather than the actuator current which is the primary cause. The present invention provides a more simplified approach to offset correction.

SUMMARY OF THE INVENTION

The present invention is directed to a process for compensating for offset in the actuator current measurement of a disc drive. The disc drive includes power means providing the actuator current to the actuator of the drive. A sensor is responsive to the actuator current and provides a feedback signal representative of the magnitude and direction of the actual actuator current. The power means is responsive to the feedback signal to derive the actuator current. In accordance with the process for compensating for offset in the actuator current, actuator current is supplied by the power means to the actuator at a magnitude designed to operate the actuator to move the transducer in first and second opposite directions at predetermined constant velocities. The actual velocities are measured, and the feedback signal is adjusted based on any difference between the actual velocities measured in the first and second directions.

One feature of the present invention resides in the use of the maximum design velocities for the constant velocities.

Another feature of the present invention resides in the measurement of the actual velocities by determining the amount of time required for the transducer to cross a predetermined number of tracks.

DETAILED DESCRIPTION OF THE PREFERRED EMBODIMENTS

Figure 1:
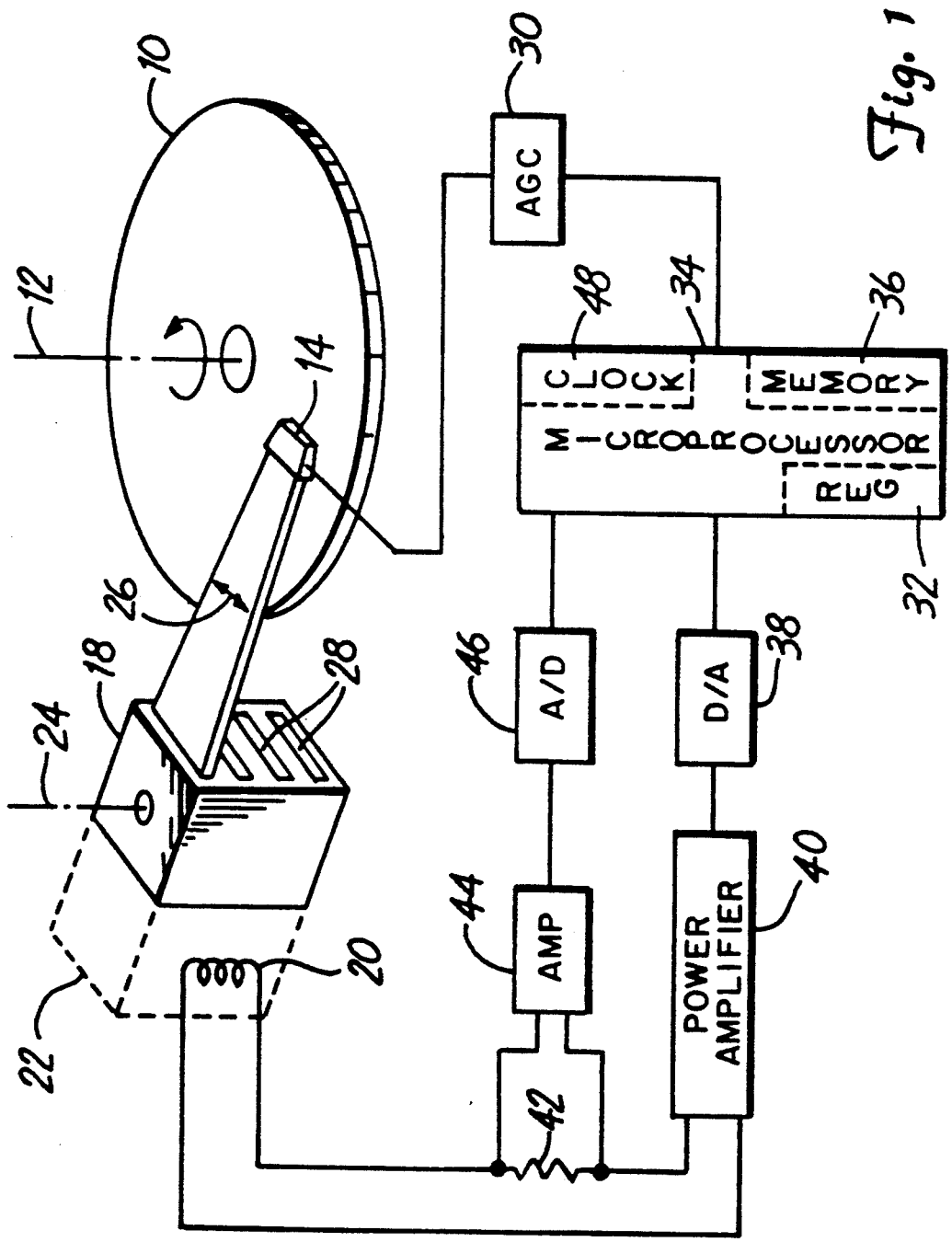
FIG. 1 is a block diagram of the apparatus for carrying out the process in accordance with the presently preferred embodiment of the present invention.

FIG. 1 illustrates a rigid magnetic disc 10 typically mounted to a spindle (not shown) for rotation about axis 12. Read/write transducing head 14 is mounted to arm 16 attached to actuator 18. Actuator coil 20 is included in housing 22, shown in dashed lines in the figure, to rotate actuator 18 about its axis 24, thereby radially moving the magnetic head 14 across the surface of disc 10 as shown by arrow 26. A track address is associated with each track, the track address being read by head 14 each time the track is crossed. Typically, disc 10 will be part of a disc stack containing a plurality of discs mounted to a common spindle arranged to rotate about a common axis 12. Also typically, a plurality of head-arm assemblies 14 are mounted to actuator 18, as indicated by the various slots 28 in the actuator. For example, the disc 10 and the head 14 shown in the drawings may be part of the servo disc and servo head mechanism for the disc drive, whereas the other discs and heads (not shown) may be data discs and heads as is well known in the art.

Head 14 provides an output through automatic gain control circuit (AGC) 30 which in turn provides an input to microprocessor 34. Typically, the head reads the track address of each track, which address is provided through the AGC to the microprocessor to determine the precise track location of head 14.

In a track seek operation, microprocessor 34 extracts from its memory 36 a demand velocity profile and provides a number to digital-to-analog (D/A) converter 38. As heretofore explained, D/A converter 38 may be a nine-bit converter operable to provide increasing currents in one direction at counts above the binary equivalent of 256 and increasing currents in the opposite direction at counts below the binary equivalent of 256. A count of binary 256 would normally be considered a null point usually producing zero current. D/A converter 38 provides an analog signal to power amplifier 40 which provides the actuator current to actuator coil 20. The magnitude of the actuator current is dependent upon the analog signal from D/A converter 38, which in turn is dependent on the count from microprocessor 34.

The current through actuator coil 20 also flows through sensor resistor 42 to establish a voltage across resistor 42 representative of the amount and direction of the actuator current through actuator coil 20. The voltage across resistor 42 is provided as an input to amplifier 44 which in turn provides an analog signal to analog-to-digital (A/D) converter 46 which in turn provides a digital output signal to microprocessor 34. Particularly, A/D converter may be a nine-bit converter which is nominally operated to provide a count of binary 256 when a zero voltage appears across sensor resistor 42, the A/D converter providing greater or smaller counts depending on the amount and polarity of the voltage (the polarity representing the actuator current direction). In operation of the apparatus, A/D converter 46 provides a digital representation of the magnitude and direction of current through resistor 42, and hence through actuator coil 20. The digital information from A/D converter 46 is employed by microprocessor 34 to control D/A converter 38, and hence the magnitude of the current supplied by power amplifier 40. Hence, the feedback signal provided by sensor resistor 42 and A/D converter 46 to microprocessor 34 operates to control the rotational position of actuator 18, as well as the acceleration of the actuator, and hence the velocity of radial movement of head 14 across the disc surface of disc 10.

One problem associated with the apparatus illustrated in the figure, and as thus far described as in the prior art, is that current sensing resistor 42, amplifier 44 and A/D converter 46 themselves can introduce current offset to the digital signal provided at the microprocessor 34. This offset, when combined with offsets already provided by the microprocessor in accordance with position seeking information through AGC 30, adversely affects the output of microprocessor through D/A converter 38 and power amplifier 40, thereby generating an erroneous actuator current for actuator coil 20, causing a mismatch between the demand velocity and the resulting actual velocity. Consequently, the risk exists that the head will overshoot or undershoot the destination track during a seek operation. Accordingly, it is desirable to compensate for current offset.

In accordance with the present invention, microprocessor 34 operates D/A converter 38 to drive power amplifier 40 to provide an actuator current to actuator coil 20 to thereby accelerate the movement of transducing head 14 in a first radial direction until a predetermined constant velocity is reached. Preferably, this predetermined velocity is the maximum design velocity, $V_{max}$, for the head. The actuator maintains the predetermined maximum velocity for a fixed predetermined distance, X, as represented by a predetermined number of track crossings. Thus, track addresses are read by transducing head 14 and inputed into microprocessor 34. When a predetermined track address, for example address A, clock 48 in microprocessor 34 is started. When a predetermined address, for example A+X, is reached, indicating a first movement of the head a predetermined distance, X, the elapsed time determined by clock 48 is recorded by the microprocessor. Upon completion of this first pass, microprocessor 34 operates D/A converter 38 and power amplifier 40 to drive actuator coil 20 with a current in the opposite direction designed to accelerate movement of the transducing head 14 in the opposite direction from the first pass so that the head 14 travels at the same predetermined maximum constant velocity in the opposite direction for the same predetermined distance, X. Again, the addresses of the start track, B and the destination track, B−X, are read to measure the distance, and clock 48 measures the time required to the second pass. Any difference in recorded time periods from the two passes (moving the head at constant velocity over the same predetermined distance in opposite directions) is indicative of offset in the actuator current measurement. Microprocessor 34 increments or decrements a count in offset register 32. The count in register 32 is combined with the count from A/D converter 46 to raise or lower the count provided to D/A converter 38. The process is repeated for both directions until the amount of time to accomplish the two passes in opposite directions are significantly close as to indicate a minimum offset.

Figure 2:
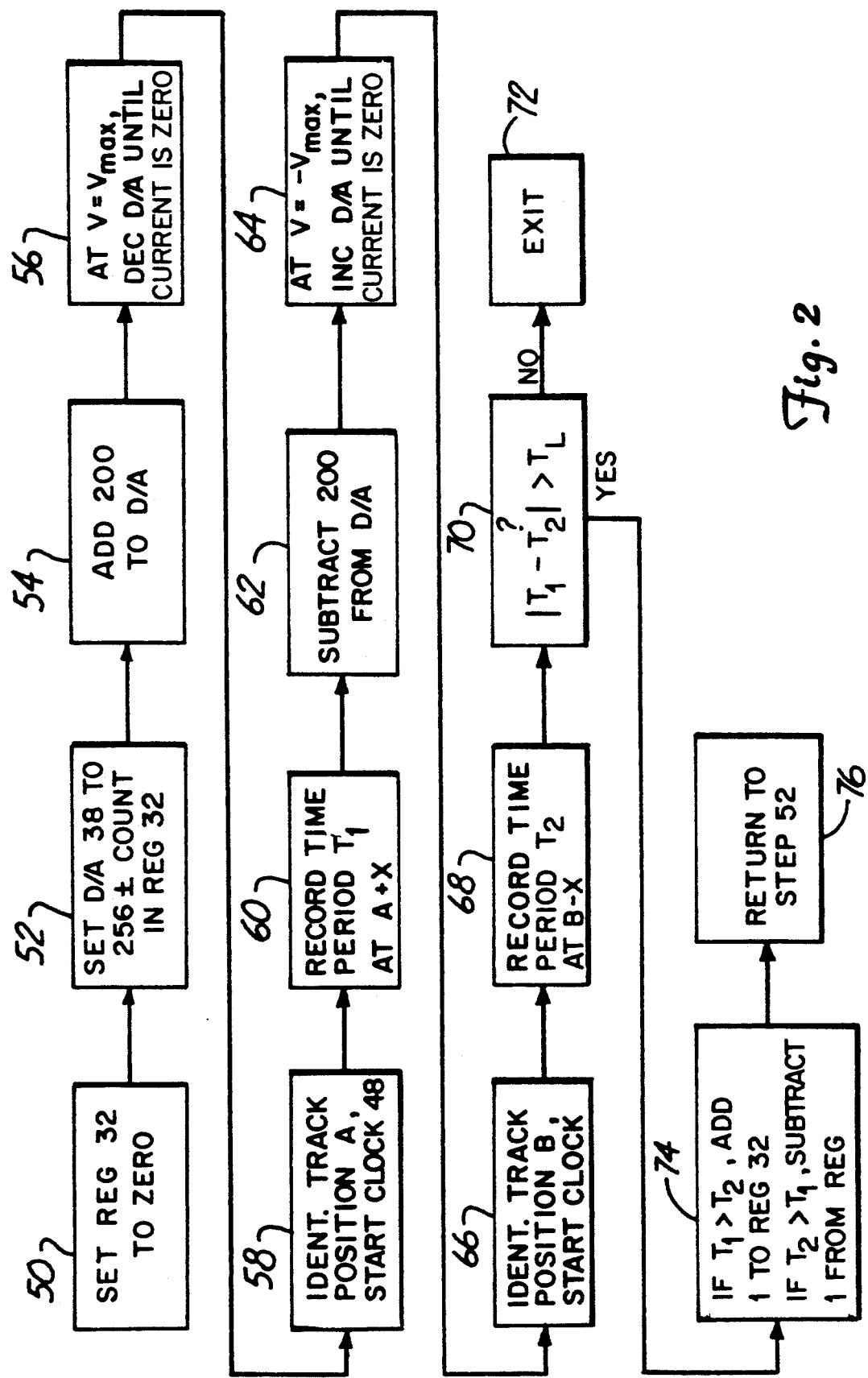
FIG. 2 is a flow chart illustrating the steps of the process according to the presently preferred embodiment of the present invention.

FIG. 2 is a flow chart illustrating the process of the present invention in greater detail. At step 50, the count in offset register 32 is set to zero, thereby clearing any offset correction history. At step 52, the count in D/A converter 38 is set to binary 256 to operate power amplifier 40 to provide a zero actuator current to actuator coil 20. (As will be explained, the 256 count from the memory of microprocessor is modified by the count in register 32.) At step 54, microprocessor 34 adds a count of 200 to D/A converter 38 to increase the count to 456, thereby operating amplifier 40 to provide maximum acceleration current to actuator coil to accelerate head 14 in a first direction. As the head crosses tracks, the track addresses are read and, microprocessor 34 determines the velocity of the head using clock 48. As indicated at step 56, when the velocity, V, reaches maximum velocity, $V_{max}$, the count in D/A converter 38 is reduced by an amount so that actuator current is reduced to zero, namely so that the count from A/D converter, less the count in register 32, provides an output count of 256 indicating a zero actuator current. With zero current to coil 20, actuator 16 will continue to move at $V_{max}$. At step 58, track address A is identified and clock 48 is started to record elapsed time. When the microprocessor determines that a predetermined number of track have been crossed, indicating movement of the head in a radial direction across the disc by a distance X, the elapsed time $T_1$ is recorded (step 60), and the process is ready to be repeated in the opposite direction.

At step 62, a count of 200 is subtracted from D/A converter 38 to reduce the count to 56, thereby operating amplifier 40 to provide maximum acceleration current to actuator coil to accelerate head 14 in an opposite direction. Microprocessor 34 determines the velocity of the head, and as indicated at step 64, when the velocity, V, reaches maximum velocity, $-V_{max}$, the D/A converter 38 is operated to increase the count to return the actuator current to zero. At step 66, track position B is identified and clock 48 is started to record elapsed time. When counter 32 determines that a predetermined number of track crossing have occurred, thereby indicating movement of the head in a radial direction across the track by distance X, the elapsed time $T_2$ is recorded (step 68).

At steps 56 and 64 where the count to the D/A converter was returned to a value where the actuator current is zero, the actual change in count may be greater or smaller than the 200 count to accelerate to maximum velocity. The actual change in count to D/A converter 38 is determined by A/D converter 46 and register 32, and more particularly the count necessary to generate an actual actuator current of zero, as detected by the A/D converter and register 32. The count change, therefore, may be the original 200 count shift, plus or minus an amount caused by offset. The offset in the two directions is additive in that offset affecting the feedback signal in one direction in one sense will affect the feedback signal in the opposite direction in the opposite sense. Hence, if the two time periods determined by the two passes are different, the difference reflects a double effect of the offset.

At step 70 the two time periods are compared to determine if the difference is greater than a design limit, $T_L$. More particularly, one time period is subtracted from the other and the absolute value of the difference is compared to $T_L$, $|T_1 - T_2| > T_L$. If the absolute value of $T_1 - T_2$ is not greater than $T_L$, then the offset is deemed corrected and the compensation process is ended as at step 72. On the other hand, if the absolute value of $T_1 - T_2$ is greater than $T_L$, then an adjustment is made to the digital output of A/D converter 46 at step 74. More particularly, a binary count of 1 is added to the contents of offset register 32 by microprocessor 34 if $T_1$ is greater than $T_2$, whereas a binary count of 1 is subtracted from the contents of offset register 32 by microprocessor 34 if $T_1$ is smaller than $T_2$. (Negative values of the contents of register 32 are indicated by flags, as is well known in the art.) As shown at step 76, the process is iteratively repeated to increase or decrease the contents of offset register 32 until the absolute value of the difference of $T_1$ and $T_2$ is smaller than the limit $T_L$ and the process exits at step 72.

It may be desirable to more closely approximate the offset correction in one pass by adjusting the contents of offset register 32 by an amount designed to perform the correction. In this respect, the count added to or subtracted from offset register 32 may be based on the amount of the difference between $T_1$ and $T_2$ to thereby more quickly correct the offset.

During operation of the apparatus, when the microprocessor reads a count from A/D converter 46, that count is modified by the contents of register 32. Thus, if microprocessor 34 operates to provide a nominal binary count of 256 to D/A converter 38 (indicating a zero current is to be applied to actuator 20), that count is increased to 257 or decreased to 255, depending on the count in register 32. Under such conditions, the feedback count from A/D converter 46 will indicate a zero actuator current.

Although the present invention is described in connection with operating the actuator to move the head identical predetermined distances in each of two directions, it is understood that the actual distance may be different for the two passes, the only requirement being that the velocities can be determined for both passes. Thus, if the time and distance is measured for each of the two directions, then the comparison and relationships described at steps 70 and 72 would be based on $|V_1 - V_2| > V_L$ and adding 1 to offset register 32 if $V_1 > V_2$, and subtracting 1 from offset register 32 if $V_2 > V_1$, where $V_1$ and $V_2$ are the actual velocities in the first and second directions, and $V_L$ is the predetermined limit of the difference between $V_1$ and $V_2$.

The present invention thus provides a simple and effective process for compensating for current offset in the actuator circuit of a disc drive servo system. The technique is simple, effective, and requires no additional equipment beyond that already present in the disc drive.

Although the present invention has been described with reference to preferred embodiments, workers skilled in the art will recognize that changes may be made in form and detail without departing from the spirit and scope of the invention.

What is claimed is:

1. In a disc drive having power means responsive to a feedback signal for providing actuator current to an actuator, the actuator being operable in response to the actuator current to accelerate and decelerate a transducer, and a sensor responsive to the actuator current for deriving the feedback signal representative of the magnitude of the actuator current, the method of compensating for offset comprising:

operating the actuator in a manner designed to move the transducer at a predetermined constant speed in a first direction;

operating the actuator in a manner designed to move the transducer at the same constant speed in a second direction opposite the first direction;

determining first and second actual speeds at which the transducer moves in the respective first and second directions; and altering said signal feedback if the first and second actual speeds differ by more than a predetermined difference.

2. The method of compensating for offset according to claim 1 wherein the power means includes a digital-to-analog converter responsive to a digital count to provide the actuator current, the value of the digital count being representative of the direction and magnitude of the intended actuator current, and a predetermined value of the digital count being a null count to which the digital-to-analog converter is responsive to produce an intended zero actuator current, wherein the step of operating the actuator to move the transducer in the first direction at a predetermined speed comprises providing a digital count having a first value to said digital-to-analog converter to accelerate the actuator in the first direction to the predetermined speed and thereupon providing a digital count having said predetermined value to maintain the predetermined speed, and the step of operating the actuator to move the transducer in the second direction at the predetermined speed comprises providing a digital count having a second value to said digital-to-analog converter to accelerate the actuator in the second direction to the predetermined speed and thereupon providing a digital count having said predetermined value to maintain the predetermined speed.

3. The method of compensating for offset according to claim 2 wherein the sensor is a sensor resistor in series with the actuator and power means to develop a voltage across the sensor resistor based on the actuator current, and the feedback signal is derived by applying the voltage across the sensor resistor to an analog-to-digital converter, said step of altering the feedback signal comprises comparing the absolute value of the difference between the first and second actual speeds exceeds the predetermined limit, determining a count representative of the difference between the first and second actual speeds, and modifying the value of the digital count to the digital-to-analog converter in response to the determined count.

4. The method of compensating for offset according to claim 3 wherein the determined count is increased if the first actual speed is greater than the second actual speed or is decreased if the first actual speed is smaller than the second actual speed.

5. The method of compensating for offset according to claim 2 wherein the step of determining first and second actual speeds at which the transducer moves in the respective first and second directions comprises measuring the time required to move the transducer across a predetermined number of tracks on a disc operatively associated with the disc drive in each of the first and second directions while the digital count to the digital-to-analog converter is at said predetermined value.

6. The method of compensating for offset according to claim 5 wherein the sensor is a sensor resistor in series with the actuator and power means to develop a voltage across the sensor resistor based on the actuator current, and the feedback signal is derived by applying the voltage across the sensor resistor to an analog-to-digital converter, said step of altering the feedback signal comprises comparing the absolute value of the difference between the times required to move the transducer across a predetermined number of tracks in each of the first and second directions to a predetermined limit, and, if the absolute value of the difference exceeds the predetermined limit, determining a count representative of the difference between the times, and modifying the value of the digital count to the digital-to-analog converter in response to the determined count.

7. The method of compensating for offset according to claim 6 wherein the determined count is increased if a first time is greater than the second time or is decreased if the first time is smaller than the second time.

8. The method of compensating for offset according to claim 1 wherein the step of determining first and second actual speeds at which the transducer moves in the respective first and second directions comprises measuring the time required to move the transducer across a predetermined number of tracks on a disc operatively associated with the disc drive in each of the first and second directions.

9. The method of compensating for offset according to claim 8 wherein the sensor is a sensor resistor in series with the actuator and power means to develop a voltage across the sensor resistor based on the actuator current, and the feedback signal is derived by applying the voltage across the sensor resistor to an analog-to-digital convertor, said step of altering the feedback signal comprises comparing the absolute value of the difference between the times required to move the transducer across a predetermined number of tracks in each of the first and second directions to a predetermined limit, and, if the absolute value of the difference exceeds the predetermined limit, determining a count representative of the difference between the times, and modifying the value of the digital count to the digital-to-analog converter in response to the determined count.

10. The method of compensating for offset according to claim 9 wherein the determined count is increased if a first time is greater than the second time or is decreased id the first time is smaller than the second time.

11. The method of compensating for offset according to claim 1 wherein the sensor is a sensor resistor in series with the actuator and power means to develop a voltage across the sensor resistor based on the actuator current, and the feedback signal is derived by applying the voltage across the sensor resistor to an analog-to-digital converter, said step of altering the feedback signal comprises comparing the absolute value of the difference between the first and second actual speeds to a predetermined limit, and, if the absolute value of the difference between the first and second actual speeds exceeds the predetermined limit, determining a count representative of the difference between the first and second actual speeds, and modifying the value of the digital count to the digital-to-analog converter in response to the determined count.

12. The method of compensating for offset according to claim 11 wherein the determined count is increased if the first actual speed is greater than the second actual speed or is decreased if the first actual speed is smaller than the second actual speed.

13. The method of compensating for offset according to claim 1 wherein the feedback signal is altered if $|V_1-V_2|>V_L$, where $V_1$ and $V_2$ are the first and second speeds, respectively, and $V_L$ is the predetermined difference.

14. The method of compensating for offset according to claim 13 wherein if the feedback signal is altered, it is increased if $V_1$ is greater than $V_2$, and is decreased if $V_1$ is smaller than $V_2$.

15. In a disc drive having an actuator operable in response to a signal to accelerate and decelerate a transducer, the method of compensating said signal for offset comprising:
  operating said actuator in a manner designed to move said transducer at a predetermined constant speed in a first direction for a predetermined distance;
  operating said actuator in a manner designed to move said transducer at the same constant speed in a second direction opposite the first direction for the same distance;
  determining first and second time intervals during which said transducer moves in said respective first and second directions; and
  altering said signal if said first and second time intervals differ by more than a predetermined difference.

16. The method of compensating for offset according to claim 15 wherein the signal is an actuator signal and a digital-to-analog converter is responsive to a digital count to provide the actuator signal, the value of the digital count being representative of the direction and magnitude of the intended actuator signal, and a predetermined value of the digital count being a null count to which the digital-to-analog converter is responsive to produce an intended zero actuator current, wherein the step of operating the actuator to move the transducer at a predetermined speed in a first direction comprises providing a digital count having a first value to said digital-to-analog converter to provide an actuator signal to accelerate the actuator in the first direction to the predetermined speed and thereupon providing a digital count having said predetermined value to provide a zero-valued actuator signal to maintain the predetermined speed, and the step of operating the actuator to move the transducer at the same speed in the second direction comprises providing a digital count having a second value to said digital-to-analog convector to provide an actuator signal to accelerate the actuator in the second direction to the predetermined speed and thereupon providing a digital count having said predetermined value to provide a zero-valued actuator signal to maintain the predetermined speed.

17. The method of compensating for offset according to claim 16 wherein a sensor resistor is in series with the actuator to develop a voltage across the sensor resistor based on the signal, and an analog-to-digital converter is responsive to the voltage across the sensor resistor to develop a feedback signal, said step of altering the actuator signal comprises comparing the absolute value of the difference between the first and second time intervals to a predetermined limit, and, if the absolute value of the difference between the first and second time intervals exceeds the predetermined limit, determining a count representative of the difference between the first and second time intervals, and modifying the value of the digital count to the digital-to-analog converter in response to the determined count.

18. The method of compensating for offset according to claim 17 wherein the determined count is increased if the first time interval is greater than the second time interval or is decreased if the first time interval is smaller than the second time interval.

19. The method of compensating for offset according to claim 17 further including a microprocessor containing digital speed demand profiles, said digital-to-analog converter being responsive to the digital speed demand profile and the feedback signal to provide the actuator signal.

20. The method of compensating for offset according to claim 15 wherein the signal is an actuator signal and a sensor resistor is in series with the actuator to develop a voltage across the sensor resistor based on the actuator signal, and an analog-to-digital converter is responsive to the voltage across the sensor resistor to develop a feedback signal, said step of altering the actuator signal comprises comparing the absolute value of the difference between the first and second time intervals to a predetermined limit, and, if the absolute value of the difference between the first and second time intervals exceeds the predetermined limit, determining a count representative of the difference between the first and second time intervals, and modifying the value of the digital count to the digital-to-analog converter in response to the determined count.

21. The method of compensating for offset according to claim 20 wherein the determined count is increased id the first time interval is greater than the second time interval or is decreased if the first time interval is smaller than the second time interval.

22. The method of compensating for offset according to claim 15 wherein said signal is altered if $|T_1-T_2|>T_L$, where $T_1$ and $T_2$ are the first and second time intervals, respectively, and $T_L$ is the predetermined difference.

23. The method of compensating for offset according to claim 22 wherein if the feedback signal is altered, it is increased if $T_1$ is greater than $T_2$, and is decreased if $T_1$ is smaller than $T_2$.

* * * * *

UNITED STATES PATENT AND TRADEMARK OFFICE
CERTIFICATE OF CORRECTION

PATENT NO. : 5,329,409
DATED : July 12, 1994
INVENTOR(S) : RANDALL D. HAMPSHIRE

It is certified that error appears in the above-indentified patent and that said Letters Patent is hereby corrected as shown below:

Col. 2, line 29, delete "5,184,571", insert --5,189,571--

Col. 7, line 59, after "second actual", insert --speeds to a predetermined limit, and, if the absolute value of the difference between the first and second actual--

Col. 8, line 47, delete "convertor", insert --converter--

Col. 8, line 60, delete "id", insert --if--

Col. 9, line 48, delete "id", insert --if--

Col. 9, line 60, delete "convector", insert --converter--

Signed and Sealed this

Twenty-seventh Day of December, 1994

Attest:

BRUCE LEHMAN

Attesting Officer            Commissioner of Patents and Trademarks